(12) United States Patent
Chen et al.

(10) Patent No.: US 12,307,719 B2
(45) Date of Patent: May 20, 2025

(54) CALIBRATION SCALE, CALIBRATION METHOD AND APPARATUS, AND DETECTION METHOD AND APPARATUS

(71) Applicant: CONTEMPORARY AMPEREX TECHNOLOGY (HONG KONG) LIMITED, Hong Kong (CN)

(72) Inventors: Guan Chen, Ningde (CN); Fei Chen, Ningde (CN); Guannan Jiang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 146 days.

(21) Appl. No.: 18/229,309

(22) Filed: Aug. 2, 2023

(65) Prior Publication Data
US 2024/0062423 A1    Feb. 22, 2024

Related U.S. Application Data

(63) Continuation of application No. PCT/CN2023/082890, filed on Mar. 21, 2023.

(30) Foreign Application Priority Data

Aug. 17, 2022    (CN) .......................... 202210989282.7

(51) Int. Cl.
*G06T 7/80* (2017.01)
*G03B 35/04* (2021.01)
(Continued)

(52) U.S. Cl.
CPC ................ *G06T 7/85* (2017.01); *G03B 35/04* (2013.01); *G03B 37/00* (2013.01); *G06T 3/40* (2013.01);
(Continued)

(58) Field of Classification Search
CPC ... G06T 7/80; G06T 7/85; G06T 2207/10012; G06T 2207/20221; G06T 2207/32;
(Continued)

(56) References Cited

U.S. PATENT DOCUMENTS 6,963,428 B1 *  11/2005  Gann ................... H04N 1/0303
                                                    250/236
9,752,863 B2 *   9/2017  Hinderling .............. G01S 17/86
(Continued)

FOREIGN PATENT DOCUMENTS

CN        101261738 A      9/2008
CN        101419177 A      4/2009
(Continued)

OTHER PUBLICATIONS

The World Intellectual Property Organization (WIPO) International Search Report for PCT/CN2023/082890 Jul. 11, 2023 6 pages (including English translation).
(Continued)

*Primary Examiner* — Brian P Yenke
(74) *Attorney, Agent, or Firm* — ANOVA LAW GROUP, PLLC

(57) ABSTRACT

A calibration scale includes a scale body and at least two calibration pattern subsets arranged on the scale body along a first direction. The at least two calibration pattern subsets include a plurality of first calibration blocks arranged at spacings along the first direction and staggered along a second direction. Projections of the plurality of first calibration blocks in each calibration pattern subset along the first direction have a first overlapping area. Projections of at least two first overlapping areas along the first direction have a second overlapping area.

15 Claims, 9 Drawing Sheets

(51) Int. Cl.
  *G03B 37/00* (2021.01)
  *G06T 3/40* (2024.01)
  *G06T 3/4038* (2024.01)
  *G06T 5/50* (2006.01)
  *H04N 13/246* (2018.01)
  *H01M 4/04* (2006.01)

(52) U.S. Cl.
  CPC ............ *G06T 3/4038* (2013.01); *G06T 5/50* (2013.01); *H04N 13/246* (2018.05); *G06T 2207/10012* (2013.01); *G06T 2207/20221* (2013.01); *H01M 4/0404* (2013.01)

(58) Field of Classification Search
  CPC ....... G06T 3/4038; G06T 3/40; H04N 13/246; H04N 2201/044; G03B 37/00; G03B 35/04
  See application file for complete search history.

(56) References Cited

U.S. PATENT DOCUMENTS

| | | | |
|---|---|---|---|
| 10,565,737 B1* | 2/2020 | Islam | G06T 7/75 |
| 10,812,778 B1 | 10/2020 | Wang et al. | |
| 11,562,502 B2* | 1/2023 | Wallack | H04N 13/246 |
| 11,587,260 B2* | 2/2023 | Thrimawithana | G06T 7/85 |
| 12,096,150 B2* | 9/2024 | Ilan | H04N 23/81 |
| 2007/0058717 A1* | 3/2007 | Chosak | G06T 7/246 |
| | | | 375/240.26 |
| 2013/0010081 A1* | 1/2013 | Tenney | H04N 13/20 |
| | | | 348/47 |
| 2015/0015701 A1* | 1/2015 | Yu | H04N 23/58 |
| | | | 348/136 |
| 2015/0070468 A1* | 3/2015 | Pfeffer | G01B 11/2513 |
| | | | 348/46 |
| 2016/0061954 A1* | 3/2016 | Walsh | G01S 17/86 |
| | | | 356/139.03 |
| 2016/0134860 A1* | 5/2016 | Jovanovic | G01B 11/25 |
| | | | 348/50 |
| 2016/0210733 A1* | 7/2016 | Kikuchi | G06T 7/85 |
| 2016/0227193 A1* | 8/2016 | Osterwood | G01S 17/42 |
| 2017/0188015 A1* | 6/2017 | Heidemann | H04N 13/239 |
| 2018/0176465 A1* | 6/2018 | Chen | H04N 23/667 |
| 2019/0147609 A1* | 5/2019 | Lohry | G06V 20/64 |
| | | | 382/154 |
| 2019/0222825 A1* | 7/2019 | Lee | H04N 13/246 |
| 2022/0084246 A1 | 3/2022 | Dai | |
| 2022/0245760 A1* | 8/2022 | Ardö | G06T 3/4038 |
| 2023/0420745 A1* | 12/2023 | Xu | H01M 10/0409 |
| 2024/0077310 A1* | 3/2024 | Rüegg | G06T 7/85 |
| 2024/0153141 A1* | 5/2024 | Qiu | G06V 10/761 |
| 2024/0166460 A1* | 5/2024 | Mao | G06T 7/80 |
| 2024/0219875 A1* | 7/2024 | Ding | B29C 64/393 |
| 2025/0022103 A1* | 1/2025 | Niazi | G06T 7/20 |

FOREIGN PATENT DOCUMENTS

| | | |
|---|---|---|
| CN | 103175851 A | 6/2013 |
| CN | 104021540 A | 9/2014 |
| CN | 105891540 A | 8/2016 |
| CN | 111385565 A | 7/2020 |
| CN | 112802123 A | 5/2021 |
| CN | 113379845 A | 9/2021 |
| CN | 113393463 A | 9/2021 |
| CN | 113658265 A | 11/2021 |
| CN | 113689506 A | 11/2021 |
| CN | 113983934 A | 1/2022 |
| CN | 114463445 A | 5/2022 |
| CN | 216898747 U | 7/2022 |
| CN | 114862966 A | 8/2022 |
| WO | 2020134412 A1 | 7/2020 |
| WO | 2021254110 A1 | 12/2021 |
| WO | 2022160760 A1 | 8/2022 |

OTHER PUBLICATIONS

The China National Intellectual Property Administration (CNIPA) The First Office Action for Chinese Application 202210989282.7 May 7, 19, 2023 12 Pages (With Translation).
The European Patent Office (EPO) The Extended European Search Report for Application No. 23741967.6 10 Pages.

* cited by examiner

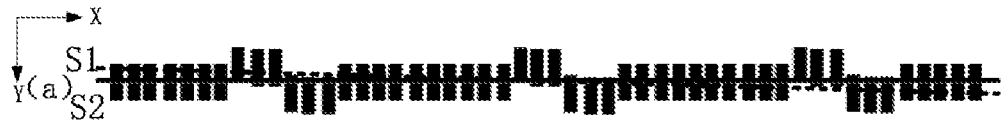

FIG. 3

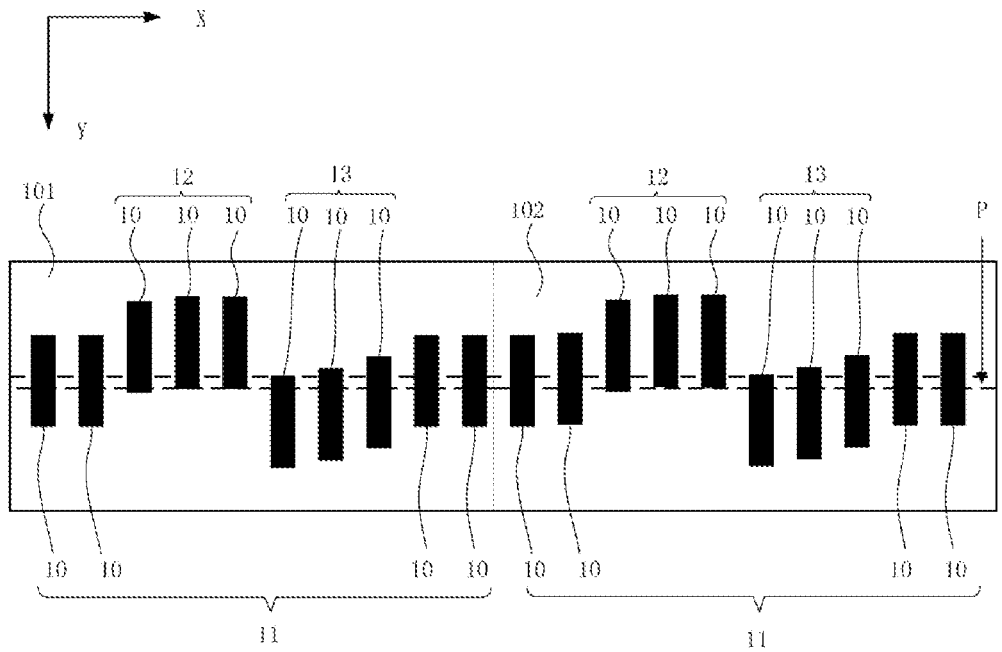

FIG. 4

```
┌─────────────────────────────────────────┐  S201
│ Provide a calibration scale, and arrange │
│ the calibration scale in a correlation   │
│ area of a target object                  │
└─────────────────────────────────────────┘
                    │
                    ▼
┌─────────────────────────────────────────┐  S202
│ For each of at least two cameras,        │
│ determine a scan path of the camera      │
│ based on at least one calibration        │
│ pattern subset on the calibration scale  │
└─────────────────────────────────────────┘
```

FIG. 5

CALIBRATION SCALE, CALIBRATION METHOD AND APPARATUS, AND DETECTION METHOD AND APPARATUS

CROSS-REFERENCE TO RELATED APPLICATIONS

The present application is a continuation of International Application No. PCT/CN2023/082890, filed on Mar. 21, 2023, which claims priority to Chinese Patent Application No. 202210989282.7, filed on Aug. 17, 2022 and entitled "CALIBRATION SCALE, CALIBRATION METHOD AND APPARATUS, AND DETECTION METHOD AND APPARATUS", which are incorporated herein by reference in their entirety.

TECHNICAL FIELD

The present application relates to the field of battery technologies, and in particular, to a calibration scale, a calibration method and apparatus, an image splicing method and apparatus, a film roll detection method and apparatus, a control apparatus, and a computer-readable storage medium.

BACKGROUND ART

An electrode plate, as the basis of a traction battery, directly determines electrochemical performance and safety of the battery. A battery electrode plate includes a metal current collector and a coating uniformly applied onto the metal current collector. Therefore, a coating process is an indispensable critical step of a battery manufacturing process, and quality of the coating process significantly affects battery quality. Therefore, to ensure battery production quality, detection and analysis on an electrode plate of a lithium battery after the coating process are particularly important.

During battery manufacturing, a number of electrode plates obtained after each coating and cutting process can be increased through wide-range coating, thereby improving production efficiency and reducing manufacturing costs. However, a size of wide-range coating is large. This also imposes a higher requirement on a processing capability of a supporting device. For example, when an image processing technology is used to analyze and detect a coating film roll, a field of view of a single camera cannot cover an entire width range of a coating. When a plurality of cameras are used for photographing, a plurality of captured images need to be spliced and calibrated. A conventional splicing and calibration algorithm is complex and requires a large amount of calculation. This greatly increases pressure on timing, and can hardly meet a requirement for detection timing.

SUMMARY

The present application is intended to solve at least one of technical problems in some cases. To this end, an object of the present application is to propose a size measurement method and apparatus for wide-range coating, a control apparatus, and a computer-readable storage medium, to simplify a method for splicing and calibrating a plurality of coating images, and improve the efficiency of coating analysis and detection.

An embodiment in a first aspect of the present application provides a calibration scale, including a scale body and a calibration pattern arranged on the scale body. The calibration pattern includes at least two calibration pattern subsets arranged along a first direction of the scale body. The at least two calibration pattern subsets include a plurality of first calibration blocks arranged at spacings along the first direction and staggered along a second direction of the scale body. For each calibration pattern subset, projections of a plurality of first calibration blocks along the first direction have a first overlapping area, and a length of the first overlapping area along the second direction is less than or equal to a first preset threshold. Projections of at least two first overlapping areas along the first direction have a second overlapping area.

In the technical solution of this embodiment of the present application, the calibration pattern of the calibration scale is designed such that scan trajectories of a plurality of cameras can be approximately kept on a straight line after calibration. In this way, a calibrated camera does not need to correct each image when subsequently splicing captured images, and a process of generating a plurality of image matrices to correct a plurality of images can be eliminated. An image processing method is simple, and is less time-consuming, thereby improving the efficiency of image processing.

In some embodiments, the first direction is perpendicular to the second direction.

According to this embodiment, the first direction and the second direction are set to be perpendicular, so that pattern arrangement for the first calibration blocks is simplified. This helps simplify subsequent calibration and calculation, and improves the accuracy of a detection result.

In some embodiments, the at least two calibration pattern subsets each include a first pattern group, a second pattern group, and a third pattern group that are staggered along the second direction, where the first pattern group includes at least two first calibration blocks with projections along the first direction completely overlapping, the second pattern group includes at least one first calibration block, the first calibration block in the second pattern group is shifted in a forward direction of the second direction relative to the first calibration blocks in the first pattern group, the third pattern group includes at least one first calibration block, and the first calibration block in the third pattern group is shifted in a reverse direction of the second direction relative to the first calibration blocks in the first pattern group.

According to this embodiment, the calibration pattern with such a specific pattern design can reduce the amount of calculation in a camera path calibration step, and improve the calibration efficiency.

In some embodiments, for each of at least one calibration pattern subset, a spacing distance between any two adjacent first calibration blocks along the first direction is equal to a preset value.

According to this embodiment, a spacing distance between adjacent first calibration blocks along the first direction is set to the preset value, so that first calibration blocks in a subsequently obtained calibrated image can be distributed more uniformly. This reduces a subsequent calculation error of coordinates and resolutions, and improves the detection accuracy.

In some embodiments, the calibration scale further includes a second calibration block used for splicing locating, where the second calibration block is located in a junction area between two adjacent calibration pattern subsets along the first direction.

According to this embodiment, the second calibration block is arranged in the junction area between the two adjacent calibration pattern subsets such that the second calibration block can be scanned by both corresponding cameras. This facilitates adjustment of capturing fields of view of the cameras. In this way, spliced coordinates can be located more conveniently and more accurately during splicing based on coordinate information of a same object in different images. This makes an image splicing method simple and efficient, and improves the efficiency and accuracy of image splicing.

In some embodiments, the scale body is transparent, a shape of the first calibration block is a rectangular shape, a square shape, or a circular shape, a shape of the second calibration block is a rectangular shape, a square shape, or a circular shape, and the first preset threshold is 0.5 mm.

According to this embodiment, a location relationship between the calibration pattern and a target object can be clearly displayed through the transparent scale body, thereby facilitating subsequent comparison between images and calculation. A more regular shape of the first calibration block is more conducive to calculation of coordinates and resolutions, and leads to a more accurate calibration result, so that an error between different images can be reduced, thereby improving the accuracy of a detection result. If the first preset threshold is excessively large, a scan error increases, and accuracy of calibration and subsequent measurement is affected. If the first preset threshold is excessively small, difficulty of camera calibration and debugging increases. When a minimum overlapping range is less than 0.5 mm, a balance can be achieved between calibration accuracy and workload of camera calibration and adjustment.

In some embodiments, the scale body is a pressing roller of a roller press or a transmission roller of a conveyor.

In this embodiment, a pressing roller of a roller press or a transmission roller of a conveyor is used as the scale body. This can simplify arrangement of the calibration scale, and can ensure consistency between an arrangement direction of the calibration pattern on the calibration scale and an extension direction of the pressing roller or the transmission roller, so that the detection result is more accurate.

An embodiment in a second aspect of the present application provides a camera calibration method for image splicing, including:
  providing a calibration scale, and arranging the calibration scale in a correlation area of a target object; and
  for each of at least two cameras, determining a scan path of the camera based on at least one calibration pattern subset on the calibration scale.

In the technical solution of this embodiment of the present application, the calibration scale is arranged in the correlation area of the target object, so that a calibration range can be properly planned based on a size range of the target object, and a calibrated camera can capture an image of the target object at an appropriate location, angle, and scan trajectory. This improves image quality, and also facilitates subsequent image splicing, thereby improving the efficiency of image processing during splicing.

In some embodiments, the calibration scale further includes a second calibration block that is used for splicing locating and located between two adjacent calibration pattern subsets along a first direction, and the at least two cameras are in a one-to-one correspondence with the at least two calibration pattern subsets, where
  for each of the at least two cameras, a scan path of the camera is determined based on a calibration pattern subset on the calibration scale that is in a one-to-one correspondence with the camera, where a calibrated image includes the second calibration block; and
  at least two calibrated images are spliced based on the second calibration block.

According to this embodiment, cameras are arranged in a one-to-one correspondence with calibration pattern subsets, so that all image content of the target object can be obtained through segmented photographing, to prevent the segmented photographing from causing loss of some content and affecting accuracy of subsequent detection. The second calibration block can help adjust capturing fields of view of the cameras, and makes an image splicing method simple and efficient, thereby improving the efficiency of image splicing.

In some embodiments, the determining a scan path of the camera based on at least one calibration pattern subset on the calibration scale includes: adjusting a location of the camera to scan the calibration pattern subset; adjusting a scan trajectory of the camera so that the camera sequentially scans all first calibration blocks in the calibration pattern subset; and determining, as the scan path, a scan trajectory obtained when projections of both a scan trajectory of the camera and a scan trajectory of an adjacent camera along the first direction completely fall within a second overlapping area.

According to this embodiment, a scan trajectory obtained when projections of trajectories of different cameras along the first direction completely fall within the second overlapping area is determined as a final scan path, so that scan paths of different cameras are unified. An image obtained in this way has a higher compatibility, thereby eliminating a cumbersome and complex image correction process before splicing, and improving the efficiency of image processing.

In some embodiments, the camera calibration method further includes: obtaining at least two calibrated images respectively captured by the at least two cameras along the scan path; splicing the at least two calibrated images to obtain a complete calibrated image; and calculating a resolution of a sub-area in which any first calibration block in the complete calibrated image is located.

According to this embodiment, a spliced image does not need to undergo separate image correction. The complete calibrated image is divided into a plurality of areas based on a location of each first calibration block, and resolutions of different areas can be calculated based on a size of each first calibration block, to avoid a large deviation of calculation during subsequent size measurement due to inconsistent imaging ratios at different locations, and ensure accuracy of a measurement result.

In some embodiments, the calculating a resolution of a sub-area in which any first calibration block in the complete calibrated image is located includes: obtaining an actual dimension of the first calibration block on the calibration scale along a direction of the scan path; obtaining calibration coordinates of the any first calibration block in the complete calibrated image; and calculating, based on the actual dimension and the calibration coordinates, the resolution of the sub-area in which the any first calibration block in the complete calibrated image is located.

According to this embodiment, the complete calibrated image is divided into a plurality of areas based on a location of each first calibration block. For each area, a resolution of the area can be calculated based on coordinates and an actual dimension of a first calibration block in the area, to avoid a large deviation of calculation during subsequent size measurement due to inconsistent imaging ratios at different locations, and ensure accuracy of a measurement result.

An embodiment in a third aspect of the present application provides an image splicing method, including: obtaining at least two images respectively captured by at least two cameras calibrated by using any one of the foregoing camera calibration methods; and splicing the at least two images to obtain a spliced image.

In the technical solution of this embodiment of the present application, before splicing of images captured by cameras calibrated by using the foregoing camera calibration method, it is unnecessary to obtain intrinsic and extrinsic parameters of each camera or generate an image matrix for the camera to correct each image. This greatly reduces processing timing spent before splicing, and avoids impact of image distortion on a subsequent calculation result, thereby improving the efficiency of image processing while ensuring the accuracy of the calculation result.

An embodiment in a fourth aspect of the present application provides a film roll detection method, including:
  providing the calibration scale according to any one of the foregoing embodiments;
  arranging the calibration scale in a correlation area of a roller or a film roll wound around a roller;
  providing at least two cameras, and calibrating the at least two cameras based on the calibration scale to obtain a scan path of the at least two cameras and a complete calibrated image;
  obtaining at least two sub-images of different areas of the film roll by using the at least two calibrated cameras respectively, and splicing the at least two sub-images to obtain a panoramic image of the film roll; and
  calculating a target parameter based on the complete calibrated image and the panoramic image.

In the technical solution of this embodiment of the present application, cameras are calibrated based on the calibration scale arranged in the correlation area of the roller or the film roll wound around the roller, such that the at least two cameras can respectively obtain high-quality sub-images that are easier to splice. It is unnecessary to obtain intrinsic and extrinsic parameters of each camera or generate an image matrix for the camera to correct each image. Location coordinates and a size of coating can be calculated directly based on location coordinate information of a first calibration block in and out of the image. This can avoid impact of image distortion on a calculation result and reduce time required for subsequent splicing and calculation, and can meet a timing requirement of a production process.

In some embodiments, the first direction is parallel to an extension direction of the roller or a width direction of the film roll.

In this embodiment, the first direction is arranged to be parallel to the extension direction of the roller or the width direction of the film roll, so that an algorithm for subsequently calculating a dimension of the film roll along the width direction is simpler, and a calculation result is more accurate.

In some embodiments, the providing at least two cameras, and calibrating the at least two cameras based on the calibration scale to obtain a scan path of the at least two cameras and a complete calibrated image includes:
  determining the scan path of the at least two cameras based on the calibration scale;
  obtaining at least two calibrated images captured by the at least two cameras along the scan path;
  splicing the at least two calibrated images to obtain the complete calibrated image; and
  calculating a resolution of a sub-area in which any first calibration block in the complete calibrated image is located.

In this embodiment, the cameras are calibrated, so that operation attitude of the cameras can be adjusted to obtain to-be-spliced images with a higher quality, and resolutions of different areas can also be obtained. This effectively controls impact of image distortion on a detection result, and can improve accuracy of subsequent detection.

In some embodiments, the target parameter includes: at least one of a coating width, a coating gap width, a coating edge width, and a coating defect dimension.

In this embodiment, accuracy of a calculation result can be improved, and an amount of calculation can be greatly reduced, thereby shortening the time for calculating a related size of the film roll, and meeting the requirements for detection accuracy and detection timing.

An embodiment in a fifth aspect of the present application provides a camera calibration apparatus for image splicing, including:
  the calibration scale according to any one of the foregoing embodiments; and
  a calibration module configured to calibrate at least two cameras based on the calibration scale.

In this embodiment, the camera calibration apparatus enables calibrated cameras to obtain images that are easier to splice, to meet the requirements for detection accuracy and detection timing.

An embodiment in a sixth aspect of the present application provides an image splicing apparatus, including:
  an obtaining unit configured to obtain at least two images captured by at least two cameras calibrated by using the camera calibration method according to any one of the foregoing embodiments; and
  a splicing unit configured to splice the at least two images to obtain a spliced image.

In this embodiment, the image splicing apparatus can accurately and quickly splice a plurality of images. This improves splicing efficiency, and also provides high-quality images and data for subsequent detection, to meet the requirements for detection accuracy and detection timing.

An embodiment in a seventh aspect of the present application provides a film roll detection apparatus, including:
  a camera calibration apparatus, including the calibration scale according to any one of the foregoing embodiments and a calibration module, where the calibration module is configured to calibrate a camera based on the calibration scale arranged in a correlation area of a roller or a film roll wound around a roller;
  an image capturing apparatus, including at least two cameras arranged at spacings, where the at least two cameras are calibrated by the camera calibration apparatus;
  an image splicing apparatus configured to be in a signal connection to the image capturing apparatus to receive and splice images captured by the image capturing apparatus, to obtain a spliced image; and
  a calculation module configured to calculate a target parameter based on an image parameter of the spliced image.

In this embodiment, the film roll detection apparatus can quickly capture, splice, and detect images, thereby meet the requirements for detection accuracy and detection timing in a coating step during production of a battery electrode plate.

An embodiment in an eighth aspect of the present application provides an electronic device, including:
  at least one processor; and
  a memory communicatively connected to the at least one processor, where the memory stores instructions executable by the at least one processor, and the instructions, when executed by the at least one processor, cause the at least one processor to perform the method according to any one of the foregoing embodiments.

An embodiment in a ninth aspect of the present application provides a computer-readable storage medium, storing a computer program, where when the computer program is executed by a processor, the method according to any one of the foregoing embodiments is implemented.

BRIEF DESCRIPTION OF THE DRAWINGS

In the accompanying drawings, the same reference numerals denote the same or similar parts or elements throughout a plurality of drawings unless otherwise specified. These drawings are not necessarily drawn to scale. It should be understood that these drawings depict only some embodiments according to the disclosure herein and are not to be construed as limiting the scope of the application.

FIG. 3 is a schematic diagram of scan results of a camera along different paths according to some embodiments of the present application;

FIG. 4 is another schematic diagram of first calibration blocks of a calibration scale according to some embodiments of the present application;

FIG. 5 to FIG. 8 are a flowchart of a camera calibration method for image splicing according to some embodiments of the present application;

Figure 1:
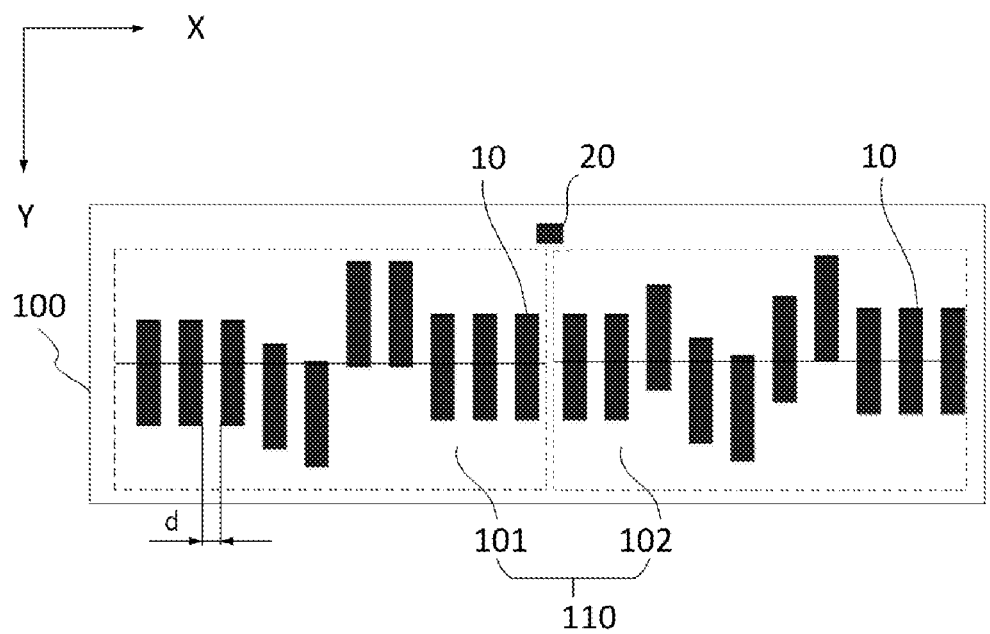
FIG. 1 is a schematic diagram of a calibration scale according to some embodiments of the present application.

LIST OF REFERENCE SIGNS a film roll 1, a roller 2, a coating area 3, first calibration blocks 10 and 21, a first pattern group 11, a second pattern group 12, a third pattern group 13, a second calibration block 20, a field of view overlapping area 30, a first camera 31, a second camera 32, a calibration scale 100, a first calibration pattern subset 101, a second calibration pattern subset 102, a calibration pattern 110, a first calibrated image 1011, a second calibrated image 1012, a complete calibrated image 1013, a panoramic image 1014, coating widths D1 and D3, a coating gap width D2, a coating edge width D4, a defect dimension D5, a width t of a first calibration block, a spacing distance d between adjacent first calibration blocks, a first scan line S1, a second scan line S2, a first scan trajectory S11, a second scan trajectory S12, a scan path SR, a film roll detection apparatus 1000, a camera calibration apparatus 200, a calibration module 210, an image capturing apparatus 300, an image splicing apparatus 400, an obtaining unit 410, a splicing unit 420, and a calculation module 500.

DETAILED DESCRIPTION OF EMBODIMENTS

Embodiments of the technical solutions of the present application will be described in detail below with reference to the accompanying drawings. The following embodiments are merely intended to more clearly illustrate the technical solutions of the present application, so they merely serve as examples, but are not intended to limit the scope of protection of the present application.

Unless otherwise defined, all technical and scientific terms used herein have the same meanings as those commonly understood by those skilled in the art to which the present application belongs. The terms used herein are merely for the purpose of describing specific embodiments, but are not intended to limit the present application. The terms "comprising" and "having" and any variations thereof in the description and the claims of the present application as well as the brief description of the accompanying drawings described above are intended to cover non-exclusive inclusion.

In the description of the embodiments of the present application, the technical terms "first", "second", etc. are merely used for distinguishing different objects, and are not to be construed as indicating or implying relative importance or implicitly indicating the number, particular order or primary-secondary relationship of the indicated technical features. In the description of the embodiments of the present application, the phrase "a plurality of" means two or more, unless otherwise explicitly and specifically defined.

The phrase "embodiment" mentioned herein means that the specific features, structures, or characteristics described in conjunction with the embodiment can be encompassed in at least one embodiment of the present application. The phrase at various locations in the description does not necessarily refer to the same embodiment, or an independent or alternative embodiment exclusive of another embodiment. Those skilled in the art understand explicitly or implicitly that the embodiment described herein may be combined with another embodiment.

In the description of the embodiments of the present application, the term "and/or" is merely intended to describe the associated relationship of associated objects, indicating that three relationships can exist, for example, A and/or B can include: only A exists, both A and B exist, and only B exists. In addition, the character "/" herein generally indicates an "or" relationship between the associated objects. In this disclosure, the phrases "at least one of A, B, and C" and "at least one of A, B, or C" both mean only A, only B, only C, or any combination of A, B, and C.

In the description of the embodiments of the present application, the term "a plurality of" means two or more (including two), similarly the term "a plurality of groups" means two or more groups (including two groups), and the term "a plurality of pieces" means two or more pieces (including two pieces).

In the description of the embodiments of the present application, the orientation or location relationship indicated by the technical terms "central", "longitudinal", "transverse", "length", "width", "thickness", "upper", "lower", "front"; "rear", "left", "right", "vertical", "horizontal", "top", "bottom", "inner", "outer", "clockwise", "counterclockwise", "axial", "radial", "circumferential", etc. are based on the orientation or location relationship shown in the accompanying drawings and are merely intended to facilitate and simplify the description of the embodiments of the present application, rather than indicating or implying that the apparatus or element considered must have a particular orientation or be constructed and operated in a particular orientation, and therefore not to be construed as limiting the embodiments of the present application.

In the description of the embodiments of the present application, unless otherwise explicitly specified and defined, the technical terms such as "install", "couple", "connect", and "fix" should be understood in a broad sense, for example, they may be a fixed connection, a detachable connection, or an integrated connection; may be a mechanical connection or an electric connection; and may be a direct connection or an indirect connection by means of an intermediate medium, or may be communication between interiors of two elements or interaction between the two elements. For those of ordinary skill in the art, the specific meanings of the above terms in the embodiments of the present application can be understood according to specific situations.

At present, from the perspective of the development of the market situation, traction batteries are used more and more widely. The traction batteries are not only used in energy storage power systems such as hydroelectric power plants, thermal power plants, wind power plants and solar power plants, but also widely used in electric transportation means such as electric bicycles, electric motorcycles, and electric vehicles and in many fields such as military equipment and aerospace. With the continuous expansion of the application field of traction batteries, the market demand for the traction batteries is also expanding.

A traction battery includes a battery cell. An electrode plate, as a main component of the battery cell, directly determines electrochemical performance and safety of the battery. A battery electrode plate includes a metal current collector and a coating uniformly applied onto the metal current collector. A coating process is a process of applying a coating onto a film roll of a current collector, and is an indispensable critical step of a battery manufacturing process, and quality of the coating process significantly affects battery quality. Therefore, to ensure battery production quality, detection and analysis on the film roll after the coating process are particularly important. In the related art, an image processing technology is used to analyze and detect a film roll.

After the coating process, the film roll of the current collector needs to be cut to form electrode plates with the specified size. A number of electrode plates obtained after each coating and cutting can be increased through a wide-range coating process. However, there is also a problem: During image capturing for the film roll, a field of view of a single camera cannot cover a width range of the entire film roll, and a plurality of cameras are required for photographing. Therefore, a plurality of captured images need to be spliced and calibrated.

The applicant has noted that, in a conventional image splicing and calibration method, there is a need to obtain intrinsic and extrinsic parameters of each camera and generate an image matrix for the camera to correct each image and eliminate distortion of a captured image, and then all images are calibrated to a same world coordinate system and then spliced. This algorithm is complex and needs to take a long time. As a result, pressure on production timing is greatly increased. However, production rhythm is continuously accelerating, and therefore this image splicing and calibration method can hardly meet a production requirement.

In view of the above, to solve problems related to splicing and calibration of a plurality of images during analysis and detection of wide-range coating, simplify an image splicing and calibration method, and improve efficiency of film roll analysis and detection, the applicant designs, through an in-depth research, a calibration scale, a camera calibration method and apparatus, an image splicing method and apparatus, a film roll detection method and apparatus, a control apparatus, and a computer-readable storage medium. In the technical solutions of the present application, first, cameras are calibrated by using a calibration scale, then images of a film roll are obtained by using calibrated cameras, then the images are spliced, and finally, a coating size is calculated based on a parameter of a spliced image, to analyze coating quality. A splicing and calibration algorithm in the present application is simple, and is less time-consuming because there is no need to generate a plurality of image matrices to correct a plurality of images. This helps improve the efficiency of coating analysis and detection, and meets the requirement for manufacturing timing.

The battery cell disclosed in the embodiments of the present application may be used in, but is not limited to, a power consuming device, such as a vehicle, a ship, or an aircraft. The power consuming device may be, but is not limited to, a mobile phone, a tablet, a notebook computer, an electric toy, a power tool, a battery cart, an electric vehicle, a ship, a spacecraft, etc. The electric toy may include a stationary or mobile electric toy, such as a game console, an electric vehicle toy, an electric ship toy, and an electric airplane toy. The spacecraft may include an airplane, a rocket, a space shuttle, a spaceship, etc.

The battery cell is a basic unit for constituting a battery. The battery cell includes a housing, an electrode assembly, and an electrolyte, and the electrode assembly includes a positive electrode plate, a negative electrode plate, and a separator. The battery cell operates mainly by relying on movements of metal ions between the positive electrode plate and the negative electrode plate. The positive electrode plate includes a positive electrode current collector and a positive electrode active material layer. A surface of the positive electrode current collector is coated with the positive electrode active material layer, the positive electrode current collector not coated with the positive electrode active material layer protrudes from the positive electrode current collector coated with the positive electrode active material layer, and the positive electrode current collector not coated with the positive electrode active material layer serves as a positive tab. Taking a lithium-ion battery as an example, the positive electrode current collector may be made of aluminum, and the positive electrode active material may be lithium cobalt oxides, lithium iron phosphate, ternary lithium, lithium manganate, etc. The negative electrode plate includes a negative electrode current collector and a negative electrode active material layer. A surface of the negative electrode current collector is coated with the negative electrode active material layer, the negative electrode current collector not coated with the negative electrode active material layer protrudes from the negative electrode current collector coated with the negative electrode active material layer, and the negative electrode current collector not coated with the negative electrode active material layer serves as a negative tab. The negative electrode current collector may be made of copper, and the negative electrode active material may be carbon, silicon, etc. During production of the battery cell, a process of applying the positive electrode active material layer onto the positive electrode current collector and applying the negative electrode active material layer onto the negative electrode current collector is referred to as a coating process, and a current collector roll that has a coating layer and that is obtained through the coating process is referred to as a film roll.

Figure 2:
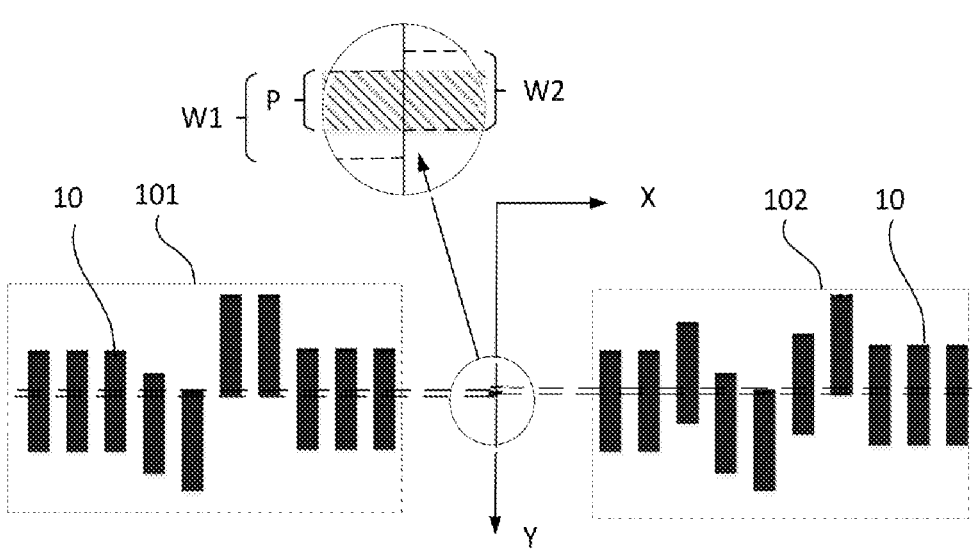
FIG. 2 is a schematic diagram of staggered first calibration blocks in calibration pattern subsets of a calibration scale according to some embodiments of the present application.

Refer to FIG. 1 to FIG. 3. FIG. 1 is a schematic diagram of a calibration scale according to some embodiments of the present application. FIG. 2 is a partial schematic diagram of a calibration scale according to some embodiments of the present application. FIG. 3 is a schematic diagram of a scan trajectory according to some embodiments of the present application.

Some embodiments in a first aspect of the present disclosure provide a calibration scale. The calibration scale includes a scale body and a calibration pattern arranged on the scale body. The calibration pattern includes at least two calibration pattern subsets arranged along a first direction. The at least two calibration pattern subsets include a plurality of first calibration blocks arranged at spacings along the first direction and staggered along a second direction. For each calibration pattern subset, projections of a plurality of first calibration blocks along the first direction have a first overlapping area, and a length of the first overlapping area along the second direction is less than or equal to a first preset threshold. Projections of at least two first overlapping areas along the first direction have a second overlapping area.

Detailed description is provided below according to FIG. 1 to FIG. 3. As shown in FIG. 1, the calibration scale 100 includes a calibration pattern 110. Two calibration pattern subsets shown in FIG. 1 are used as examples. The calibration pattern 110 includes a first calibration pattern subset 101 and a second calibration pattern subset 102 that are arranged along a first direction X. The first calibration pattern subset 101 and the second calibration pattern subset 102 each include a plurality of first calibration blocks 10 arranged at spacings along the first direction X and staggered along a second direction Y.

As shown in FIG. 2, projections of a plurality of first calibration blocks 10 in the first calibration pattern subset 101 along the first direction X have a first overlapping area W1, projections of a plurality of first calibration blocks 10 in the second calibration pattern subset 102 along the first direction X have a first overlapping area W2, a length t1 of the first overlapping area W1 along the second direction Y is less than or equal to a first preset threshold, and a length t2 of the first overlapping area W2 along the second direction Y is also less than or equal to the first preset threshold.

Projections of the first overlapping area W1 and the first overlapping area W2 along the first direction X have a second overlapping area P.

To further describe a technical principle of this embodiment of the present application, refer to FIG. 3. Description is provided below with reference to a principle of capturing a photo by a camera. Exemplarily, a camera used for scanning is a line scan camera, such as a CCD line scan camera.

As shown in (a) in FIG. 3, all first calibration blocks 10 in a calibration pattern subset of the calibration scale are arranged along the first direction X, and some first calibration blocks 10 are staggered along the second direction Y. Due to the staggered arrangement, an overlapping dimension of projections of these first calibration blocks 10 along the first direction X of the coating is small, that is, the length of the first overlapping area along the second direction is small. If a scan line, such as a first scan line S1 shown in FIG. 3, of a camera is deflected at a specific angle relative to the first direction X, the scan line may not be able to scan some of the staggered first calibration blocks, and therefore no continuous images of first calibration blocks can be obtained in an image field of view of the camera. The first scan line S1 represented by a dashed line in (a) in FIG. 3 is used an example. The scan line cannot scan some of staggered first calibration blocks, and therefore no continuous images of first calibration blocks can be obtained in the image field of view of the camera. In this case, images in a scan field of view are shown in (c) in FIG. 3, where black structures represent images of first calibration blocks, and images of three staggered first calibration blocks are missing in the images shown in (c) in FIG. 3. It can be understood that a smaller angle at which the scan line of the camera is deflected relative to the width direction X of the coating indicates that it is more likely to obtain continuous images of first calibration blocks in the scan field of view. If the scan line of the camera is consistent with the width direction X of the coating, taking a second scan line S2 represented by a solid line in (a) in FIG. 3 as an example, it can be ensured that continuous images of first calibration blocks can be obtained in the scan field of view. In this case, images in the scan field of view are shown in (b) in FIG. 3, where black structures represent images of first calibration blocks, and the images shown in (b) in FIG. 3 are presented as images of a plurality of continuous first calibration blocks.

In this embodiment, whether the scan line of the camera can scan continuous images of first calibration blocks is related to a magnitude of staggering between first calibration blocks. A smaller overlapping part between staggered first calibration blocks, that is, a smaller length of the first overlapping area, indicates that the camera is less likely to scan continuous images of first calibration blocks. In this case, a stricter requirement is imposed on an angle of the scan line of the camera. In other words, continuous images of first calibration blocks can be obtained in the scan field of view of the camera only when a deflection angle of the scan line of the camera relative to the width direction X of the coating is within a quite small error value. In this way, a scan path of the camera can be adjusted based on a status of images in the field of view of the camera. A plurality of first calibration blocks are limited to be located in the scan path of the camera, so that scan results of different cameras can be more consistent along the first direction, to facilitate subsequent splicing, calibration, and calculation.

Because different cameras are in different states when capturing images, the captured images have different degrees of distortion. As a result, a large amount of time needs to be spent on correction during image splicing. However, if photo capturing states of different cameras are unified, for example, scan paths, capture angles, field of view ranges, and other aspects are adjusted to be as consistent as possible, a difference between distortion degrees can be alleviated to some extent, thereby reducing the load of image correction. Therefore, during pattern design of the calibration scale, how to maintain consistency when a plurality of cameras separately perform scanning needs to be further considered.

As described in this embodiment, for each calibration pattern subset, projections of a plurality of first calibration blocks along the first direction have a first overlapping area, and a length of the first overlapping area along the second direction is less than or equal to the first preset threshold. In this way, if a camera performs scanning in a manner of sequentially scanning each first calibration block in a straight line, a scan path of the camera is limited to a range of the first overlapping area with a length being less than or equal to the first preset threshold. In this case, for the entire calibration scale, when a plurality of cameras simultaneously perform scanning, projections of first overlapping areas of different calibration pattern subsets along the second direction are limited to have a second overlapping area P, so that scan paths of the cameras are limited to be within the second overlapping area in which first overlapping areas of different calibration pattern subsets overlap along the second direction. This further limits a deviation between scan paths of cameras, and can also ensure consistency between scan paths of different cameras that scan different calibration pattern subsets, thereby alleviating a distortion difference between images captured by different cameras, and providing high-quality images as a basis for subsequent convenient image splicing and image detection.

According to some embodiments of the present application, as shown in FIG. 1, the first direction X is perpendicular to the second direction Y.

It can be understood that the first direction X may alternatively not be perpendicular to the second direction Y.

In this way, a scan path for scanning first calibration blocks on the calibration scale by a camera is a straight line approximately parallel to the first direction X. This arrangement simplifies pattern arrangement for the first calibration blocks, also helps simplify subsequent calibration and calculation, and improves the accuracy of a detection result.

In some embodiments, as shown in FIG. 4, the first calibration pattern subset 101 and the second calibration pattern subset 102 each include a first pattern group 11, a second pattern group 12, and a third pattern group 13 that are staggered along the second direction Y, where the first pattern group 11 includes at least two first calibration blocks 10 with projections along the first direction completely overlapping, the second pattern group 12 includes at least one first calibration block 10, the first calibration block in the second pattern group 12 is shifted in a forward direction of the second direction Y relative to the first calibration blocks in the first pattern group 11, the third pattern group 13 includes at least one first calibration block 10, and the first calibration block in the third pattern group 13 is shifted in a reverse direction of the second direction Y relative to the first calibration blocks in the first pattern group.

It should be noted that the forward direction of the second direction Y included in this embodiment is a direction indicated by an arrow of the second direction Y in FIG. 4, that is, a vertical downward direction in FIG. 4, and the reverse direction of the second direction Y referred to in this embodiment is an opposite direction of the direction indicated by the arrow of the second direction Y in FIG. 4, that is, a vertical upward direction in FIG. 4. The shifting means that a location of the first calibration block along a specific direction is shifted in a forward direction or a reverse direction. For example, as shown in FIG. 4, that the first calibration block in the second pattern group 12 is shifted in a forward direction of the second direction Y relative to the first calibration blocks in the first pattern group 11 means that the first calibration block in the second pattern group 12 is at a location closer to the forward direction of the second direction Y relative to the first calibration blocks in the first pattern group 11, that is, is at a lower location. Similarly, that the first calibration block in the third pattern group 13 is shifted in a reverse direction of the second direction Y relative to the first calibration blocks in the first pattern group means that the first calibration block 10 in the third pattern group 13 is at a location closer to the reverse direction of the second direction Y relative to the first calibration blocks 10 in the first pattern group 11, that is, is at an upper location.

Specifically, first calibration blocks in the calibration pattern subset are set to include the first pattern group, and the second pattern group and the third pattern group that are respectively shifted upward and downward based on the first pattern group. In this way, when projections of first calibration blocks in the first pattern group, the second pattern group, and the third pattern group along the first direction X have a first overlapping area smaller than the first preset threshold, it can be ensured that the first overlapping area is an area extending along a direction parallel to the first direction X. This can ensure that a subsequently calibrated scan path is approximately parallel to the first direction X, thereby reducing the amount of calculation in a camera path calibration step, and improving the calibration efficiency.

In some embodiments, patterns of the first calibration pattern subset 101 are exactly the same as patterns of the second calibration pattern subset 102. In this way, projections of a first overlapping area of the first calibration pattern subset 101 and a first overlapping area of the second calibration pattern subset 102 along the first direction completely overlap, that is, a length of the second overlapping area P along the second direction Y is the same as that of the first overlapping area. This can further simplify pattern arrangement. During calibration, locations of some first calibration blocks shifted upward or downward are mainly adjusted, thereby reducing the difficulty of camera calibration, and reducing the calibration time.

According to some embodiments of the present application, as shown in FIG. 1, a spacing distance d between any two adjacent first calibration blocks 10 in the first calibration pattern subset 101 and the second calibration pattern subset 102 along the first direction is equal to a preset value.

In this embodiment, a spacing distance between adjacent first calibration blocks along the first direction is set to the preset value, so that first calibration blocks in a calibrated image subsequently obtained by the camera through scanning are uniformly distributed. This reduces a subsequent calculation error of coordinates and resolutions, and improves the detection accuracy.

According to some embodiments of the present application, as shown in FIG. 1, the calibration scale 100 further includes a second calibration block 20 used for splicing locating, where the second calibration block 20 is located in a junction area between the first calibration pattern subset 101 and the second calibration pattern subset 102 that are adjacent to each other along the first direction X. It can be understood that there may alternatively be more than one second calibration block 20. This may be specifically determined based on the number of calibration pattern subsets on the calibration scale 100, or may be set based on a scan range of the cameras. This is not limited in this embodiment.

Cameras perform scanning at specific distances from the calibration scale. Therefore, to completely scan the calibration scale or a target object, scan ranges of adjacent cameras need to overlap to some extent, and these overlapping locations are splicing areas for subsequent splicing of a plurality of images. In this embodiment, the second calibration block 20 is arranged, such that appropriate field of view locating can be provided for scanning by the cameras, to ensure that all first calibration blocks or target objects are scanned, and avoid missing an object. In this way, locating can be performed more accurately during splicing based on coordinate information of a same object in different images. This makes an image splicing method simple and efficient, and improves the efficiency of image splicing.

In some embodiments, the scale body is transparent, a shape of the first calibration block is a rectangular shape, a square shape, or a circular shape, a shape of the second calibration block 20 is a rectangular shape, a square shape, or a circular shape, and the first preset threshold is 0.5 mm. It can be understood that the shapes of the first calibration block 10 and the second calibration block 20 may alternatively be other regular patterns or irregular patterns.

According to some embodiments of the present application, considering that the shapes of the first calibration block and the second calibration block affect an intersection coordinate algorithm for subsequently calculating a first calibration block that intersects a scan path and affect accuracy, the shapes of the first calibration block and the second calibration block are set to be regular shapes. This facilitates subsequent calculation of coordinates and resolutions, and achieves a more accurate calibration result, so that the error between different images can be reduced, and the accuracy of a detection result can be improved.

Exemplarily, the first calibration block is a rectangle with an edge parallel to the first direction. In this case, the scan path and the first calibration block basically intersect at right angles. This can greatly simplify subsequent calculation, and further improve the efficiency and accuracy of image splicing and detection.

In this embodiment, the lengths of the first overlapping area and the second overlapping area along the second direction directly affect calibration accuracy and further affect detection accuracy. Because the length of the second overlapping area does not exceed a maximum length of the first overlapping area, that is, the first preset threshold, an accuracy requirement can be met to a large extent through control of a value of the first preset threshold. The value of the first preset threshold affects accuracy of scanning and detection and workload of camera calibration. If the first preset threshold is excessively large, a scan error increases, and accuracy of calibration and subsequent measurement is affected. If the first preset threshold is excessively small, difficulty of camera calibration and debugging increases. When the first preset threshold is less than 0.5 mm, a balance can be achieved between calibration accuracy and workload of camera calibration and adjustment, to ensure accuracy while avoiding unnecessary costs.

In some embodiments, the scale body is a pressing roller of a roller press or a transmission roller of a conveyor.

In this embodiment, a pressing roller of a roller press or a transmission roller of a conveyor is used as the scale body. This can simplify arrangement of the calibration scale, and can ensure consistency between an arrangement direction of the calibration pattern on the calibration scale and an extension direction of the pressing roller or the transmission roller, so that the detection result is more accurate.

An embodiment in a second aspect of the present application provides a camera calibration method for image splicing. As shown in FIG. 5, the method includes the following steps:

In step 201, a calibration scale is provided, and the calibration scale is arranged in a correlation area of a target object. The correlation area herein refers to an area in which a deviation between a calibrated image and an actual target image is within an acceptable range, and is usually a surface of the target object. When a surface at a target location is not suitable for placing the calibration scale, the calibration scale may alternatively be placed at a surrounding location that meets a requirement.

In step 202, for each of at least two cameras, a scan path of the camera is determined based on at least one calibration pattern subset on the calibration scale.

Figure 13:
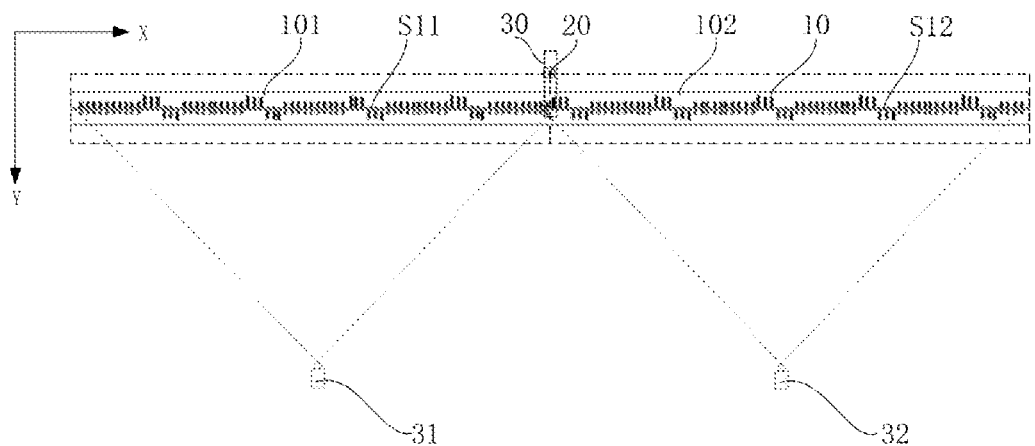
FIG. 13 is a schematic diagram of a principle for calibrating two cameras according to some embodiments of the present application.

Description is provided below by using two cameras as examples. As shown in FIG. 13, the calibration scale 100 is provided with two calibration pattern subsets: a first calibration pattern subset 101 and a second calibration pattern subset 102. The calibration scale 100 is arranged on a surface of a target object to be detected. Correspondingly, there are two cameras for scanning, and the two line scan cameras are in a one-to-one correspondence with the two calibration pattern subsets. To be specific, a first camera 31 scans an area in which the first calibration pattern subset 101 is located, and a second camera 32 scans an area in which the second calibration pattern subset 102 is located. The first calibration pattern subset 101 and the second calibration pattern subset 102 are used to calibrate scan paths of the first camera 31 and the second camera 32 respectively, so that the two cameras can capture images in an approximately same scanning manner. In this way, the two cameras can obtain images including an entire range of the calibration scale. It should be noted that a length of the calibration scale is usually slightly greater than a maximum dimension of the target object to be detected along a length direction of the calibration scale, to ensure that a complete image can be obtained.

In the technical solution of this embodiment of the present application, the calibration scale is arranged in the correlation area of the target object, so that a calibration range can be properly planned based on a size range of the target object, and a calibrated camera can capture an image of the target object at an appropriate location, angle, and scan trajectory. A shorter distance between a location of the calibration scale and a location of the target object contributes to higher consistency and accuracy of subsequently captured photos. Therefore, to maintain consistency between a calibrated image and an actual image as far as possible, the correlation area in this embodiment may be the surface of the target object, and a capturing field of view, a scan path, and a capturing angle of a camera remain unchanged after calibration, so that consistency between a captured calibrated image and a target image can be ensured. This improves image quality, and also facilitates subsequent image splicing, thereby improving the efficiency of image processing during splicing.

In some embodiments, as shown in FIG. 1, the calibration scale 100 further includes a second calibration block 20 that is used for splicing locating and located between two adjacent calibration pattern subsets along a first direction, and the at least two cameras are in a one-to-one correspondence with the at least two calibration pattern subsets. For each of the at least two cameras, a scan path of the camera is determined based on a calibration pattern subset on the calibration scale that is in a one-to-one correspondence with the camera, where a calibrated image includes the second calibration block. In addition, at least two calibrated images are spliced based on the second calibration block.

According to this embodiment, cameras are arranged in a one-to-one correspondence with calibration pattern subsets, so that all image content of the target object can be obtained through segmented photographing. During calibration, calibration of a field of view and calibration of a scan path can be simultaneously implemented through the one-to-one correspondence between the cameras and the calibration pattern subsets, thereby simplifying the calibration process. The second calibration block can mark a boundary location of calibration pattern subsets, thereby facilitating the adjustment of capturing fields of view of the cameras. During splicing, coordinates of the second calibration block are used as a reference point, so that an image splicing method is simple and efficient, and efficiency of image splicing is improved.

Figure 6:
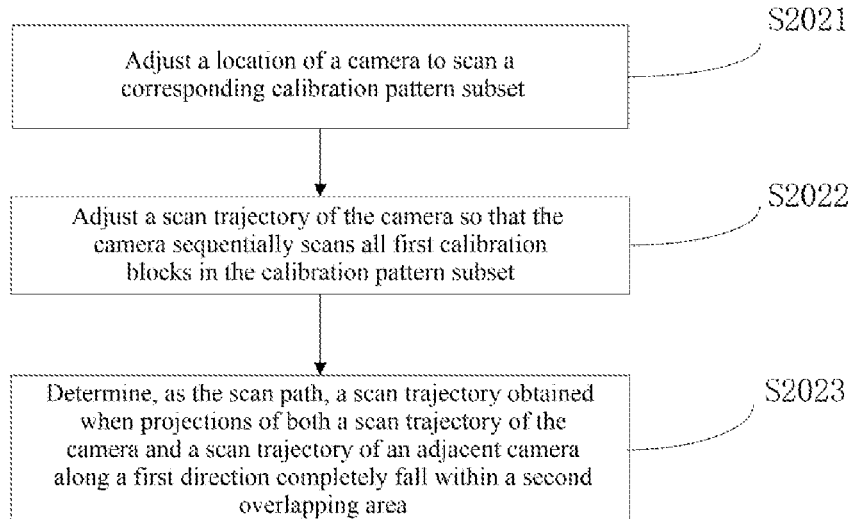

In some embodiments, as shown in FIG. 6, step S202 includes the following steps:
   step S2021: adjusting a location of the camera to completely scan the calibration pattern sub set;
   step S2022: adjusting a scan trajectory of the camera so that the camera sequentially scans all first calibration blocks in the calibration pattern subset; and
   step S2023: determining, as the scan path, a scan trajectory obtained when projections of both a scan trajectory of the camera and a scan trajectory of an adjacent camera along the first direction completely fall within the second overlapping area.

In this embodiment, a final scan path is determined based on scan trajectories of different cameras, so that scan paths of different cameras are unified. An image obtained in this way has a higher compatibility, thereby eliminating a cumbersome and complex image correction process before splicing, and improving the efficiency of image processing.

Figure 7:
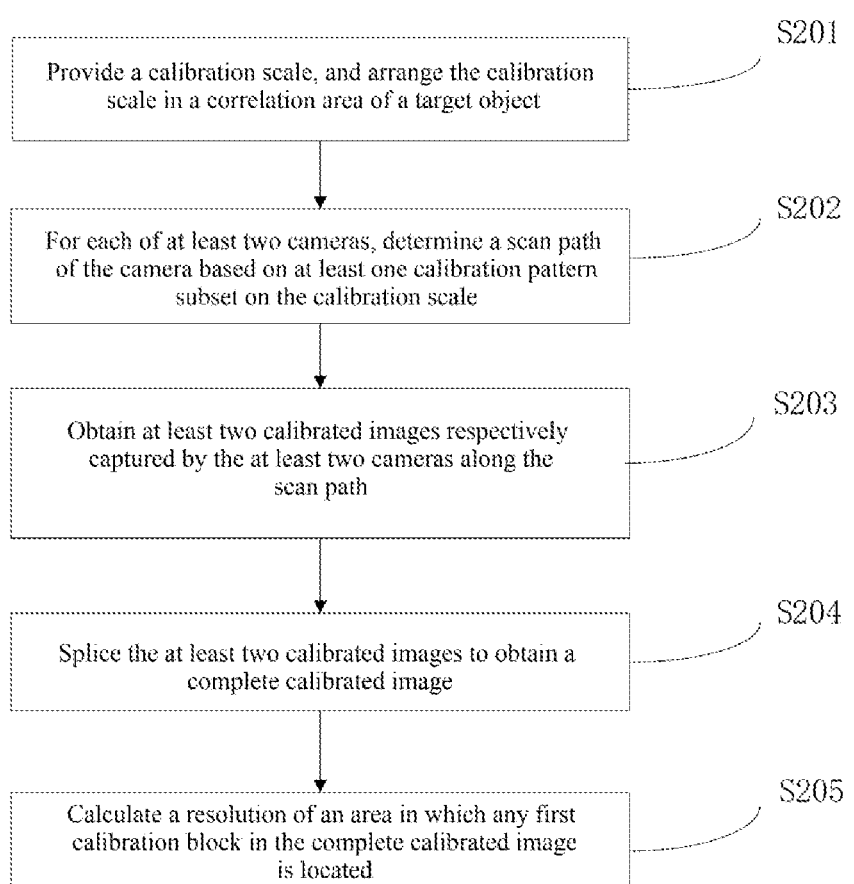

In some embodiments, as shown in FIG. 7, the camera calibration method further includes the following steps:
   step 203: obtaining at least two calibrated images respectively captured by the at least two cameras along the scan path;
   step 204: splicing the at least two calibrated images to obtain a complete calibrated image; and
   step 205: calculating a resolution of a sub-area in which any first calibration block in the complete calibrated image is located.

According to this embodiment, a spliced image does not need to undergo separate image correction. The complete calibrated image is divided into a plurality of areas based on a location of each first calibration block, and resolutions of different areas can be calculated based on a size of each first calibration block, to avoid a large deviation of calculation during subsequent size measurement due to inconsistent imaging ratios at different locations, and ensure accuracy of a measurement result.

Figure 8:
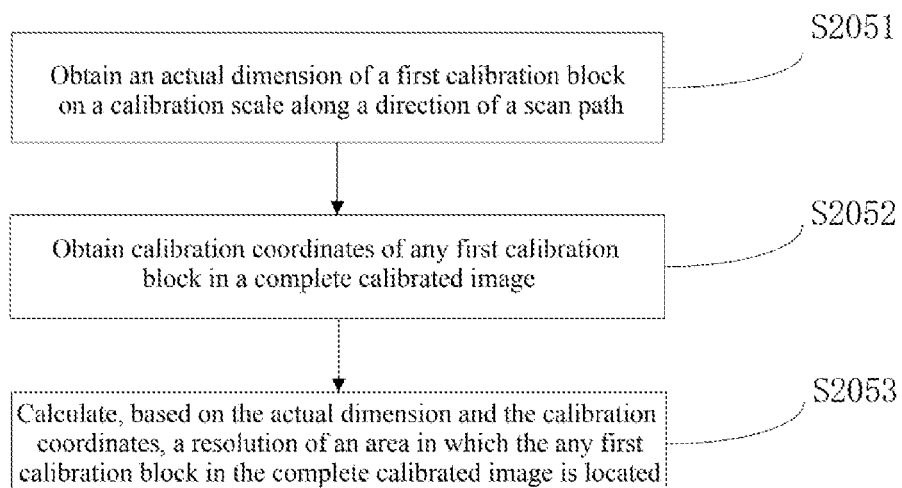

In some embodiments, as shown in FIG. 8, step S205 includes the following steps:
   step S2051: obtaining an actual dimension of the first calibration block on the calibration scale along a direction of the scan path;
   step S2052: obtaining calibration coordinates of the any first calibration block in the complete calibrated image; and
   step S2053: calculating, based on the actual dimension and the calibration coordinates, the resolution of the sub-area in which the any first calibration block in the complete calibrated image is located.

In this embodiment, the actual dimension includes a length of the first calibration block on the calibration scale along the direction of the scan path, and a spacing distance between adjacent first calibration blocks along the direction of the scan path.

According to this embodiment, the complete calibrated image is divided into a plurality of areas based on a location of each first calibration block. For each area, a resolution of the area can be calculated based on coordinates and an actual dimension of a first calibration block in the area, to avoid a large deviation of calculation during subsequent size measurement due to inconsistent imaging ratios at different locations, and ensure accuracy of a measurement result.

Figure 9:
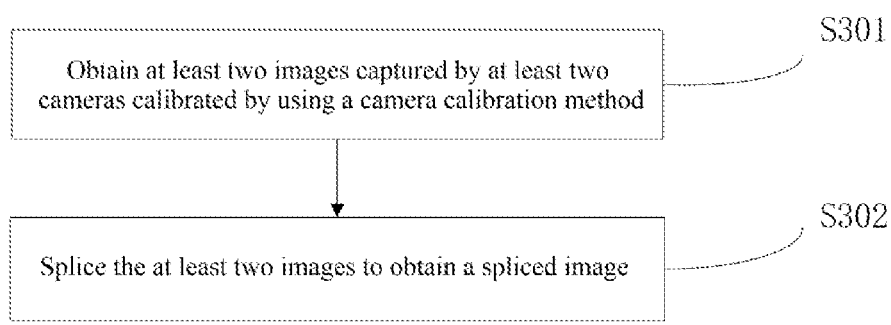
FIG. 9 is a flowchart of an image splicing method according to some embodiments of the present application.

An embodiment in a third aspect of the present application provides an image splicing method. As shown in FIG. 9, the method includes the following steps:
   step S301: obtaining at least two images captured by at least two cameras calibrated by using any one of the foregoing camera calibration methods; and
   step S302: splicing the at least two images to obtain a spliced image.

In the technical solution of this embodiment of the present application, before splicing of images captured by cameras calibrated by using the foregoing camera calibration method, it is unnecessary to obtain intrinsic and extrinsic parameters of each camera or generate an image matrix for the camera to correct each image. This greatly reduces processing timing spent before splicing, and avoids impact of image distortion on a subsequent calculation result, thereby improving the efficiency of image processing while ensuring the accuracy of the calculation result.

Figure 10:
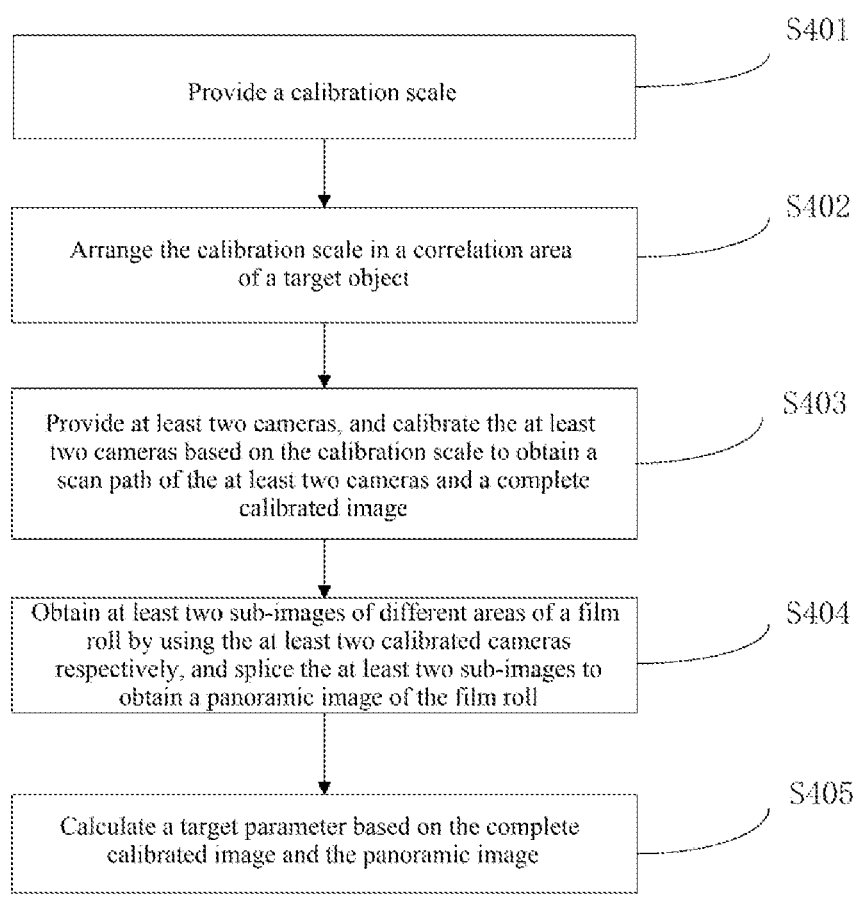
FIG. 10 and FIG. 11 are a flowchart of a film roll detection method according to some embodiments of the present application.

An embodiment in a fourth aspect of the present application provides a film roll detection method. As shown in FIG. 10, the method includes the following steps:
   step S401: providing a calibration scale;
   step S402: arranging the calibration scale in a correlation area of a target object;
   step S403: providing at least two cameras, and calibrating the at least two cameras based on the calibration scale to obtain a scan path of the at least two cameras and a complete calibrated image;
   step S404: obtaining at least two sub-images of different areas of the film roll by using the at least two calibrated cameras respectively, and splicing the at least two sub-images to obtain a panoramic image of the film roll; and
   step S405: calculating a target parameter based on the complete calibrated image and the panoramic image.

Figure 17:
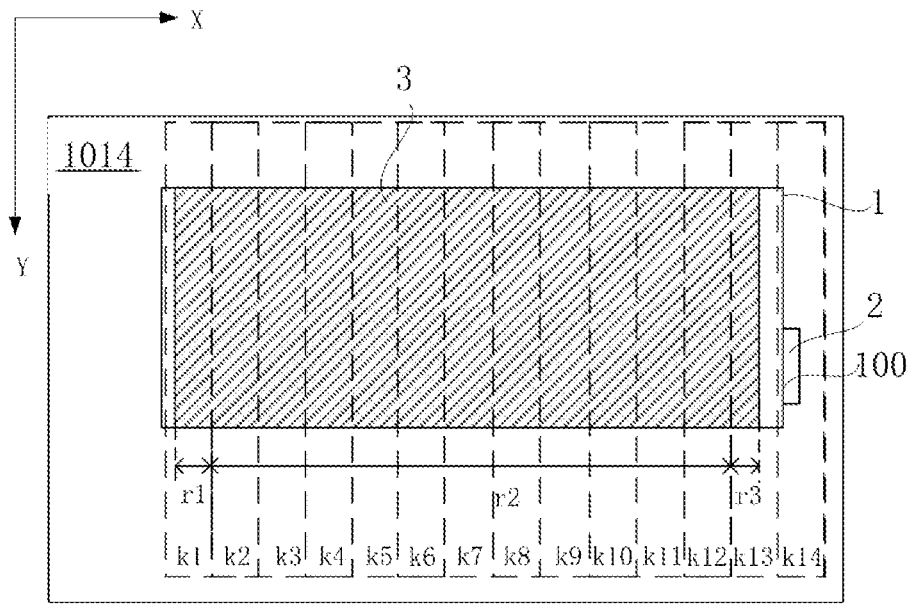
FIG. 17 is a schematic diagram of a principle of calculating a coating width of a film roll according to some embodiments of the present application.

As shown in FIG. 17, the target object herein may be a roller 2, or may be a film roll 1 wound around a roller. The correlation area may be a surface of the target object. For example, the roller 2 is a pressing roller of a roller press or a transmission roller of a conveyor. Exemplarily, the arranging the calibration scale in a correlation area of a target object may be arranging an independent calibration scale in the correlation area of the target object, or may be directly integrating the calibration scale with the target object, that is, forming the calibration scale mentioned in this embodiment in the correlation area of the target object.

In the technical solution of this embodiment of the present application, cameras are calibrated based on the calibration scale arranged on a surface of the roller or the film roll wound around the roller, such that the at least two cameras can respectively obtain high-quality sub-images that are easier to splice. It is unnecessary to obtain intrinsic and extrinsic parameters of each camera or generate an image matrix for the camera to correct each image. Location coordinates and a size of coating can be calculated directly based on location coordinate information of a first calibration block in and out of the image. This can avoid impact of image distortion on a calculation result and reduce time required for subsequent splicing and calculation, and can meet a timing requirement of a production process.

Figure 12:
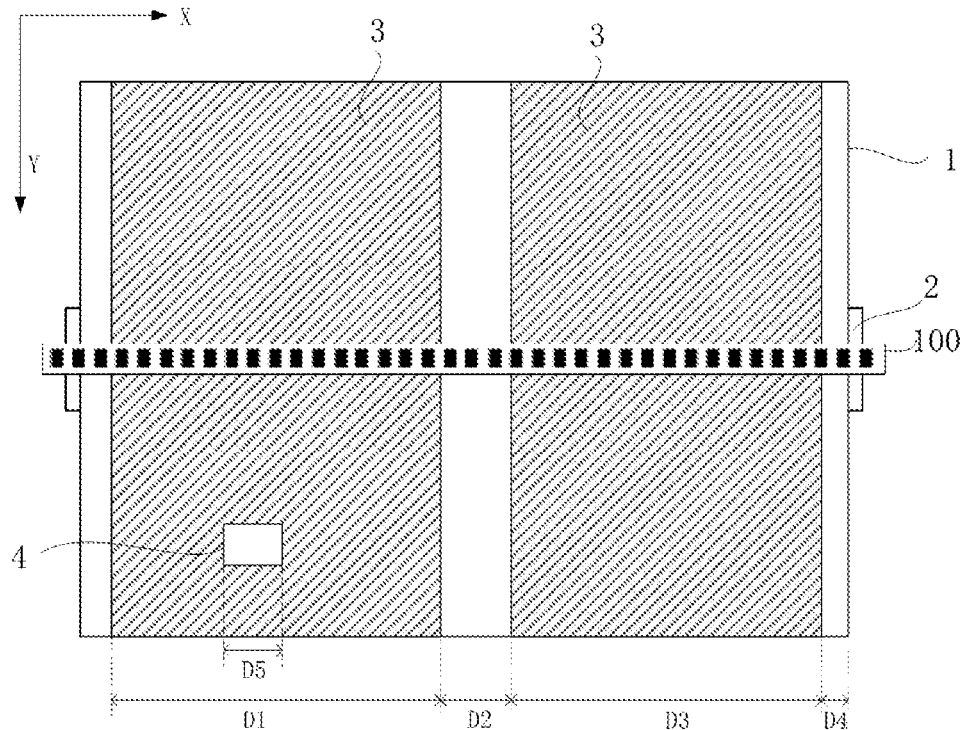
FIG. 12 is a schematic diagram of film roll detection according to some embodiments of the present application.

In some embodiments, referring to FIG. 12, the first direction X is parallel to an extension direction of the roller 2 or a width direction of the film roll 1.

In this embodiment, the first direction X of the calibration scale is arranged to be parallel to the extension direction of the roller 2 or the width direction of the film roll 1, so that an algorithm for subsequently calculating a dimension of the film roll 1 along the width direction is simpler, and a calculation result is more accurate.

Figure 11:
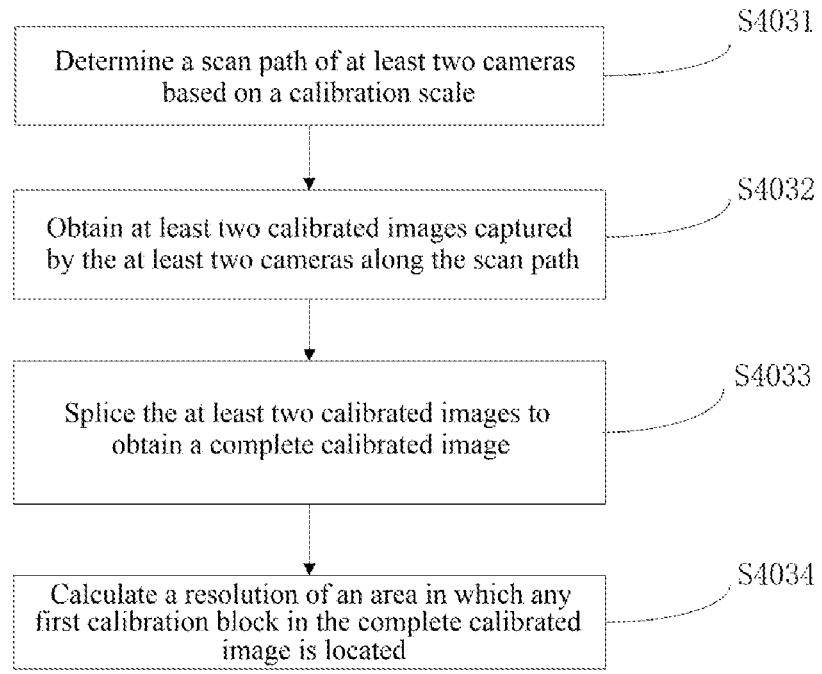

In some embodiments, as shown in FIG. 11, step S403 includes the following steps:

step S4031: determining the scan path of the at least two cameras based on the calibration scale;

step S4032: obtaining at least two calibrated images captured by the at least two cameras along the scan path;

step S4033: splicing the at least two calibrated images to obtain the complete calibrated image; and step S4034: calculating a resolution of a sub-area in which any first calibration block in the complete calibrated image is located.

In this embodiment, the cameras are calibrated, so that operation attitude of the cameras can be adjusted to obtain to-be-spliced images with a higher quality, and resolutions of different areas can also be obtained. This effectively controls impact of image distortion on a detection result, and can improve accuracy of subsequent detection.

Description is provided below with reference to technical solutions shown in FIG. 12 to FIG. 16. As shown in FIG. 12, a calibration scale 100 is arranged in a correlation area of a target object. Exemplarily, the target object is a film roll in a coating process, and may be a film roll before coating, or may be a film roll during coating or after coating, and the correlation area is a surface of the film roll.

Locations of a first camera 31 and a second camera 32 are adjusted based on a first calibration pattern subset 101 and a second calibration pattern subset 102, so that fields of view of the first camera 31 and the second camera 32 can completely cover the first calibration pattern subset 101 and the second calibration pattern subset 102 respectively. A first scan trajectory S11 of the first camera 31 is adjusted based on the first calibration pattern subset 101, and a second scan trajectory S12 of the second camera 32 is adjusted based on the second calibration pattern subset 102.

To further improve consistency between the first camera 31 and the second camera 32 during scanning, a straight line obtained when projections of the first scan trajectory S11 and the second scan trajectory S12 along a first direction completely fall within a second overlapping area is determined as a final scan path SR.

The first camera 31 and the second camera 32 respectively capture a first calibrated image 1011 about the first calibration pattern subset 101 and a second calibrated image 1012 about the second calibration pattern subset 102 along the scan path SR. Splicing locating is performed based on a location of a field of view overlapping area 30 in the first calibrated image 1011 and the second calibrated image 1012. Some repeatedly captured first calibration blocks 21 in the field of view overlapping area 30 are cut through deduplication, and then splicing is performed to obtain a complete calibrated image 1013 including a complete calibration pattern.

Further, the field of view overlapping area 30 further includes a second calibration block 20, so that the field of view overlapping area 30 can be identified more easily. In addition, the second calibration block 20 and the first calibration block 10 are staggered, so that locating coordinates different from those of the first calibration block 10 can be obtained. This can implement more accurate splicing locating during splicing, and reduce impact of image distortion.

A width of the first calibration block 10 along a direction of the scan path SR and a spacing between adjacent first calibration blocks 10 along the scan path SR can be obtained based on a location and a shape of the pattern of the calibration scale. For ease of description, herein, for example, the first calibration block 10 is a rectangle with an edge parallel to the first direction X, the first direction is perpendicular to a second direction, and the scan path SR is parallel to the first direction. As shown in FIG. 13, pattern locations of a plurality of first calibration blocks in part of the first calibration pattern subset 101 are shown in the figure. A width of the first calibration block along the first direction X is t, and a spacing between adjacent first calibration blocks 10 along the first direction is d.

Figure 14:
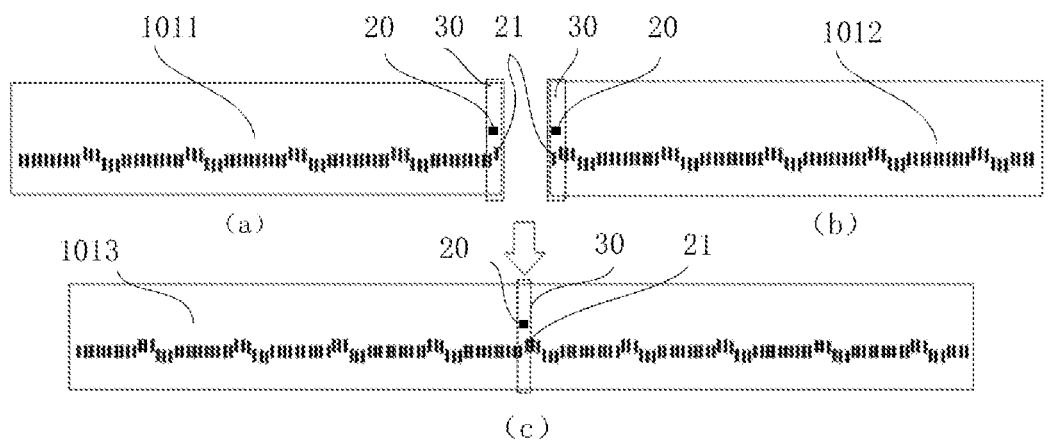
FIG. 14 is a schematic diagram of a process of splicing two images captured by two cameras according to some embodiments of the present application.
Figure 15:
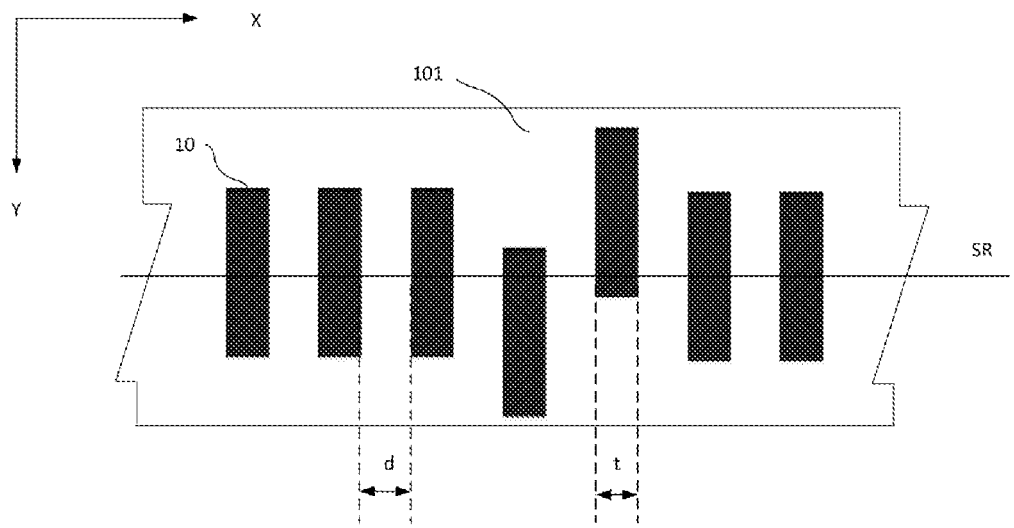
FIG. 15 and FIG. 16 are a schematic diagram of a principle for calculating resolutions of different areas of a complete calibrated image according to some embodiments of the present application.
Figure 16:
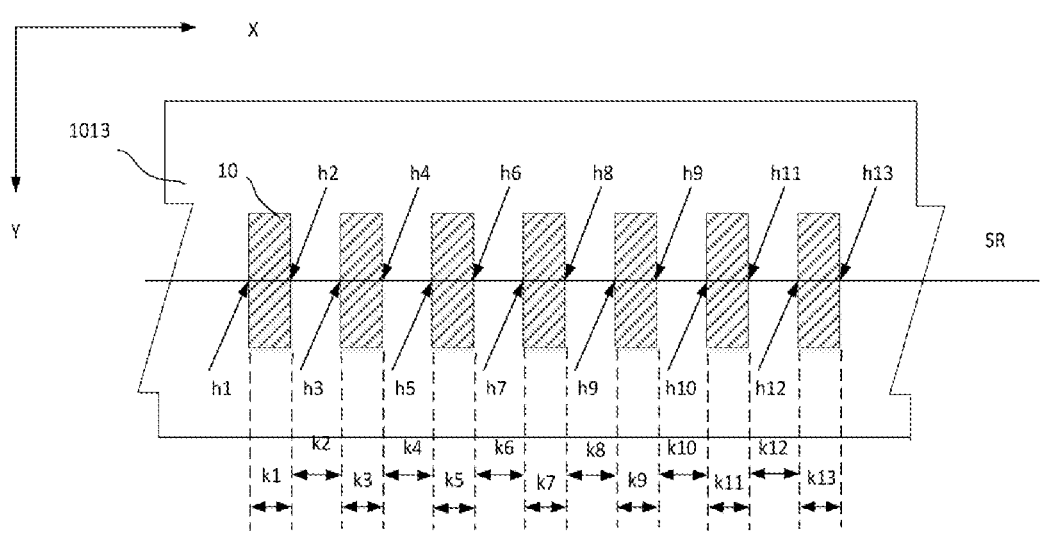

With reference to FIG. 14 to FIG. 16, an entire image of the complete calibrated image 1013 may be divided into a plurality of areas along the first direction based on locations of captured first calibration blocks 10. For example, FIG. 16 shows areas k1, k3, k5, k7, k9, k11, and k13 in which the first calibration blocks 10 are located, spacing areas k2, k4, k6, k8, k10, and k12 between adjacent first calibration blocks 10, and coordinates h1, h2, h3, h4, h5, h6, h7, h8, h9, h10, h11, h12, and h13 of intersection locations between the captured first calibration blocks 10 in the complete calibrated image 1013 and the scan path SR. In this way, a resolution of each area in the complete calibrated image 1013 can be calculated based on a length, a spacing, and location coordinates of the first calibration blocks 10. For example, as shown in FIG. 16, a resolution of the area k1 in which a leftmost first calibration block 10 is located is calculated as follows: k1=|h1−h2|/t; and a resolution of the area k2 is calculated as follows: k2=|h1−h2|/d. Resolutions of subsequent areas can be sequentially calculated according to the foregoing principle. Resolutions of all areas are calculated and then stored. For example, resolution data may be stored in an ini file, and can be directly called during subsequent measurement. This can simplify data processing in subsequent measurement and calculation.

After calibration is completed, the first camera 31 and the second camera 32 capture images of corresponding areas on the surface of the film roll, to obtain a first sub-image and a second sub-image. Splicing is performed based on a location of an overlapping area in the first sub-image and the second sub-image to obtain a panoramic image about the film roll. The splicing of the first sub-image and the second sub-image herein is consistent with the splicing principle and step of the first calibrated image and the second calibrated image in the calibration step. Subsequently, a target parameter of an object to be detected in the panoramic image may be calculated through comparison between the panoramic image and the complete calibrated image and by using parameters such as resolutions and location coordinates of sub-areas in the complete calibrated image.

In some embodiments, as shown in FIG. 12, the target parameter may be a coating width D1, a coating gap width D2, or a coating edge width D3, or may be a defect dimension D4, measured along the first direction, of a coating defect in a coating area of the film roll.

In this embodiment, accuracy of a calculation result can be improved, and an amount of calculation can be greatly reduced, thereby shortening the time for calculating a related size of the film roll, and meeting the requirements for detection accuracy and detection timing.

Description is provided below still with reference to the technical solutions shown in FIG. 12 to FIG. 17. As shown in FIG. 12 and FIG. 17, description is provided by using detection and calculation of a coating width D3 of a coating area 3 on the film roll 1 as an example. It should be noted that FIG. 17 shows a part of the panoramic image 1014, and the complete calibrated image can be obtained after camera calibration is completed. Resolutions of sub-areas in which different first calibration blocks are located may be calculated based on the complete calibrated image. During detection and calculation, stored resolution data can be directly called. As shown in FIG. 16, the complete calibrated image is correspondingly divided into 14 sub-areas based on the resolution data. For ease of description, herein, numbers corresponding to resolutions are used as names of corresponding sub-areas: k1, k2, . . . , and k14. For the coating width D3 to be calculated, as shown in FIG. 17, the coating width D3 may be divided along the first direction X into a second segment that completely overlaps with a sub-area, and a first segment and a third segment that are located at two ends of the second segment and that partially overlap with corresponding sub-areas. Therefore, the coating width D3 can be obtained provided that actual lengths corresponding to the first segment, the second segment, and the third segment are calculated.

It can be learned from a location coordinate relationship in the image that r1 is a coordinate difference between an outermost edge of the first segment and a sub-area in which the first segment is located, and r3 is a coordinate difference between an outermost edge of the third segment and a sub-area in which the third segment is located.

In this case, an actual width corresponding to the first segment is R1, where R1=r1×k1.

An actual width corresponding to the third segment is R3, where R3=r3×k12.

Assuming that widths of the areas k2, k3, k4, k5, k6, k7, k8, k9, k10, k11, and k12 are d2, d3, d4, d5, d6, d7, d8, d9, d10, d11, and d12 respectively, an actual width R2 corresponding to r2 is equal to d2×k2+d3×k3+d4×k4+d5×k5+d6×k6+d7×k7+d8×k8+d9×k9+d10×k10+d11×k11+d12×k12.

The coating width D3 is equal to a sum of the actual widths corresponding to r1, r2 and r3, that is, D3=R1+R2+R3.

In some embodiments, as shown in FIG. 15, widths t of all first calibration blocks are the same, and spacings d between adjacent first calibration blocks are also the same. This can simplify a calculation formula, and reduce an amount of calculation. Further, the spacing d is set to be equal to the width t. In this way, a length of the second segment can be calculated based on the number of sub-areas that completely overlap. The size calculation method in this embodiment greatly simplifies calculation steps, and improves efficiency of coating size calculation.

Figure 18:
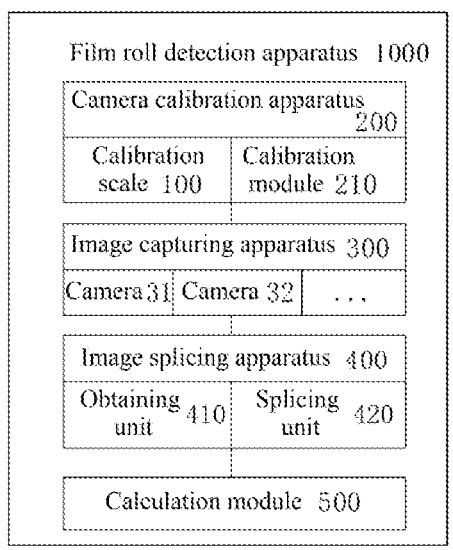
FIG. 18 is a structural block diagram of a film roll detection apparatus according to some embodiments of the present application.

An embodiment in a fifth aspect of the present application provides a camera calibration apparatus. As shown in FIG. 18, the camera calibration apparatus 200 includes: a calibration scale 100 and a calibration module 210, where the calibration module 210 is configured to calibrate at least two cameras based on the calibration scale.

The calibration scale may be manually placed in a correlation area of a target object to be detected, or may be placed in the correlation area by a component of the calibration apparatus through automatic control. This is not limited in this embodiment. The foregoing arrangement manner or other equivalent manners not shown shall fall within the scope of this embodiment.

In this embodiment, the camera calibration apparatus can automatically calibrate at least two cameras, thereby improving a degree of automation of camera calibration. Calibrated cameras can obtain images that are easier to splice, to meet the requirements for detection accuracy and detection timing.

An embodiment in a sixth aspect of the present application provides an image splicing apparatus. As shown in FIG. 18, the image splicing apparatus 400 includes:
  an obtaining unit 410 configured to obtain at least two images captured by at least two calibrated cameras; and
  a splicing unit 420 configured to splice the at least two images to obtain a spliced image.

In this embodiment, the image splicing apparatus can accurately and quickly splice a plurality of images. This improves splicing efficiency, and also provides high-quality images and data for subsequent detection, to meet the requirements for detection accuracy and detection timing.

An embodiment in a seventh aspect of the present application provides a film roll detection apparatus 1000, as shown in FIG. 18, including:
  a camera calibration apparatus 200, including a calibration scale 100 and a calibration module 210, where the calibration module 210 is configured to calibrate a camera based on the calibration scale 100 arranged on a surface of a roller 2 or a film roll 1 wound around a roller;
  an image capturing apparatus 300, including at least two cameras arranged at spacings, where the at least two cameras are calibrated by the camera calibration apparatus;
  an image splicing apparatus 400 configured to be in a signal connection to the image capturing apparatus to receive and splice images captured by the image capturing apparatus, to obtain a spliced image; and
  a calculation module 500 configured to calculate a target parameter based on an image parameter of the spliced image.

Exemplarily, the roller 2 may be a pressing roller of a roller press, or may be a transmission roller of a conveyor.

The image splicing apparatus in this embodiment may splice captured calibrated images to obtain a complete calibrated image and splice a plurality of captured images about a target object to obtain a panoramic image through one module; or may be configured as two or more modules respectively used for splicing calibrated images and splicing a plurality of images about a target object.

The image parameter in this embodiment includes a location parameter and a spacing parameter of first calibration blocks that are obtained from the calibration scale, resolutions of different areas that are obtained from the complete calibrated image, and a coordinate parameter obtained from the panoramic image.

In some embodiments, the at least two cameras may be arranged at spacings along an extension direction of the roller 2 or a width direction of the film roll 1.

In this embodiment, the film roll detection apparatus can quickly capture, splice, and detect images, thereby meet the requirements for detection accuracy and detection timing in a coating step during production of a battery electrode plate.

In some embodiments, as shown in FIG. 12, the target parameter calculated by the calculation module 500 may be coating area widths D1 and D3, a coating gap width D2, or a coating edge width D4. In addition to detection of the coating area width, a detection parameter in this embodiment may alternatively be a defect dimension D5 of a coating defect area 4 along a first direction X.

The detection method in this embodiment can detect various dimensions. A detection manner is simple and easy to implement, can meet detection requirements in a plurality of different scenarios, and can also well meet a requirement for production timing.

An embodiment in an eighth aspect of the present application provides an electronic device, including:

at least one processor; and a memory communicatively connected to the at least one processor, where the memory stores instructions executable by the at least one processor, and the instructions, when executed by the at least one processor, cause the at least one processor to perform the method according to any one of the foregoing embodiments.

Various implementations of the systems and technologies described above in this specification may be implemented in a digital electronic circuit system, an integrated circuit system, a field programmable gate array (FPGA), an application-specific integrated circuit (ASIC), an application-specific standard product (ASSP), a system-on-a-chip (SOC) system, a complex programmable logical device (CPLD), computer hardware, firmware, software, and/or a combination thereof. The implementations may include: The systems and technologies are implemented in one or more computer programs, where the one or more computer programs may be executed and/or interpreted on a programmable system including at least one programmable processor. The programmable processor may be a dedicated or general-purpose programmable processor that can receive data and instructions from a storage system, at least one input apparatus, and at least one output apparatus, and transmit data and instructions to the storage system, the at least one input apparatus, and the at least one output apparatus.

An embodiment in a ninth aspect of the present application provides a computer-readable storage medium, storing a computer program, where when the computer program is executed by a processor, the method according to any one of the foregoing embodiments is implemented.

The computer-readable medium may be a tangible medium, and may include or store a program for use by an instruction execution system, apparatus, or device, or for use in combination with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of the machine-readable storage medium may include an electrical connection based on one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof.

According to some embodiments of the present disclosure, as shown in FIG. 12 to FIG. 17, a method for measuring a size of a coating area of a film roll includes the following steps:

A calibration scale 100 is arranged on a surface of a film roll 1. The calibration scale 100 is provided with a calibration pattern 110. The calibration pattern 110 includes a first calibration pattern subset 101 and a second calibration pattern subset 102. The first calibration pattern subset 101 and the second calibration pattern subset 102 each include a plurality of first calibration blocks arranged at equal spacings along a first direction X and staggered along a second direction Y. The first direction X of the calibration scale 100 is parallel to a width direction of the film roll 1 or an extension direction of a roller 2, and the first direction X is parallel to the second direction Y. In the first direction X, the first calibration block 10 is a rectangle with a width of 5 mm, and a spacing between first calibration blocks 10 is 5 mm. A second calibration block 20 is arranged in a junction area between the first calibration pattern subset 101 and the second calibration pattern subset 102.

After being calibrated, a first camera 31 and a second camera 32 respectively scan the first calibration pattern subset 101 and the second calibration pattern subset 102 based on a scan path that is parallel to the first direction X and that is in a second overlapping area of the first calibration pattern subset 101 and the second calibration pattern subset 102, to obtain a first calibrated image 1011 and a second calibrated image 1012 that each include all first calibration block images in a corresponding calibration pattern subset. Splicing is performed based on a location of the second calibration block 20 in the first calibrated image 1011 and the second calibrated image 1012 to obtain a complete calibrated image 1013. A resolution of a sub-area in which each first calibration block is located and location coordinates of the sub-area are calculated based on the complete calibrated image, and are stored in an ini file.

Images at different locations of the film roll are captured by the first camera 31 and the second camera 32, and are spliced to obtain a panoramic image 1014 of the film roll. Location coordinates of an edge of a coating area in the panoramic image 1014 are obtained, and resolutions recorded in the ini file are called to calculate a coating width D3 of a coating area 3 on the film roll 1. Specific calculation steps are as follows:

Resolutions and location coordinates of sub-areas are read from the ini file. Actual lengths of a second segment that completely overlaps with a sub-area, and a first segment and a third segment that are located at two ends of the second segment and that partially overlap with corresponding sub-areas in a coating area in the panoramic image are calculated based on the location coordinates of the sub-areas, the resolutions of the sub-areas, and the location coordinates of the coating edge in the panoramic image, and then are added together to obtain the coating width D3.

Finally, it should be noted that the above embodiments are merely used for illustrating rather than limiting the technical solutions of the present application. Although the present application has been illustrated in detail with reference to the foregoing embodiments, it should be understood by those of ordinary skill in the art that the technical solutions described in the foregoing embodiments may still be modified, or some or all of the technical features thereof may be equivalently substituted; and such modifications or substitutions do not make the essence of the corresponding technical solution depart from the scope of the technical solutions of the embodiments of the present application, and should fall within the scope of the claims and the description of the present application. In particular, the technical features mentioned in the embodiments can be combined in any manner, provided that there is no structural conflict. The present application is not limited to the specific embodiments disclosed herein but includes all the technical solutions that fall within the scope of the claims.

What is claimed is:

1. A camera calibration method for image splicing, comprising
providing a calibration scale comprising a scale body and a calibration pattern arranged on the scale body, wherein:
the calibration pattern comprises at least two calibration pattern subsets arranged along a first direction of the scale body, and the at least two calibration pattern subsets comprise a plurality of first calibration blocks arranged at spacings along the first direction and staggered along a second direction of the scale body;
for each calibration pattern subset, projections of the plurality of first calibration blocks along the first direction have a first overlapping area, and a length of the first overlapping area along the second direction is less than or equal to a first preset threshold; and
projections of at least two first overlapping areas along the first direction have a second overlapping area;
arranging the calibration scale on a surface of a target object; and
for each of at least two cameras, determining a scan path of the camera based on at least one calibration pattern subset on the calibration scale, comprising:
adjusting a location of the camera to scan the calibration pattern subset;
adjusting a scan trajectory of the camera so that the camera sequentially scans all the first calibration blocks in the calibration pattern subset; and
determining, as the scan path, a scan trajectory obtained when projections of both a scan trajectory of the camera and a scan trajectory of an adjacent camera along the first direction completely fall within a second overlapping area.

2. The camera calibration method according to claim 1, wherein the first direction is perpendicular to the second direction.

3. The camera calibration method according to claim 1, wherein the at least two calibration pattern subsets each comprise a first pattern group, a second pattern group, and a third pattern group that are staggered along the second direction, wherein the first pattern group comprises at least two first calibration blocks with projections along the first direction completely overlapping, the second pattern group comprises at least one first calibration block shifted in a forward direction of the second direction relative to the first calibration blocks in the first pattern group, the third pattern group comprises at least one first calibration block shifted in a reverse direction of the second direction relative to the first calibration blocks in the first pattern group.

4. The camera calibration method according to claim 1, wherein for each of at least one calibration pattern subset, a spacing distance between any two adjacent first calibration blocks along the first direction is equal to a preset value.

5. The camera calibration method according to claim 1, wherein the scale body is a pressing roller of a roller press or a transmission roller of a conveyor.

6. The camera calibration method according to claim 1, wherein the calibration scale further comprises a second calibration block used for splicing locating, wherein the second calibration block is located in a junction area between two adjacent calibration pattern subsets along the first direction of the scale body.

7. The camera calibration method according to claim 6, wherein the scale body is transparent, a shape of the first calibration block is a rectangular shape, a square shape, or a circular shape, the first preset threshold is 0.5 mm, and a shape of the second calibration block is a rectangular shape, a square shape, or a circular shape.

8. The camera calibration method according to claim 1, wherein:
the calibration scale further comprises a second calibration block that is used for splicing locating and located between two adjacent calibration pattern subsets along the first direction, and the at least two cameras are in a one-to-one correspondence with the at least two calibration pattern subsets;
for each of the at least two cameras, a scan path of the camera is determined based on the calibration pattern subset corresponding to the camera, wherein a calibrated image comprises the second calibration block; and
at least two calibrated images are spliced based on the second calibration block.

9. The camera calibration method according to claim 1, further comprising:
obtaining at least two calibrated images respectively captured by the at least two cameras along the scan path;
splicing the at least two calibrated images to obtain a complete calibrated image; and
calculating a resolution of a sub-area in which one first calibration block in the complete calibrated image is located.

10. The camera calibration method according to claim 9, wherein calculating the resolution of the sub-area in which the one first calibration block in the complete calibrated image is located comprises:
obtaining an actual dimension of the one first calibration block on the calibration scale along a direction of the scan path;
obtaining calibration coordinates of the one first calibration block in the complete calibrated image; and
calculating, based on the actual dimension and the calibration coordinates, the resolution of the sub-area in which the one first calibration block in the complete calibrated image is located.

11. An image splicing method, comprising:
obtaining at least two images respectively captured by at least two cameras calibrated by using the camera calibration method according to claim 1; and
splicing the at least two images to obtain a spliced image.

12. A film roll detection method, comprising:
providing a calibration scale comprising a scale body and a calibration pattern arranged on the scale body, wherein:
the calibration pattern comprises at least two calibration pattern subsets arranged along a first direction of the scale body, and the at least two calibration pattern subsets comprise a plurality of first calibration blocks arranged at spacings along the first direction and staggered along a second direction of the scale body;
for each calibration pattern subset, projections of the plurality of first calibration blocks along the first direction have a first overlapping area, and a length of the first overlapping area along the second direction is less than or equal to a first preset threshold; and
projections of at least two first overlapping areas along the first direction have a second overlapping area;

arranging the calibration scale in a surface area of a roller or a film roll wound around the roller;

providing at least two cameras, and calibrating the at least two cameras based on the calibration scale to obtain a scan path of the at least two cameras and a complete calibrated image, comprising:

adjusting the locations of the at least two cameras based on the at least two calibration pattern subsets, so that fields of view of the at least two cameras completely cover the at least two calibration pattern subsets;

adjusting respective scan trajectories of the at least two cameras based on a respective one of the at least two calibration pattern subsets; and determining, as the scan path, a straight line obtained when projections of the respective scan trajectories along a first direction completely fall within the second overlapping area;

obtaining at least two sub-images of different areas of the film roll using the at least two calibrated cameras respectively, and splicing the at least two sub-images to obtain a panoramic image of the film roll; and calculating a target parameter based on the complete calibrated image and the panoramic image.

13. The detection method according to claim 12, wherein the first direction is parallel to an extension direction of the roller or a width direction of the film roll.

14. The detection method according to claim 12, wherein providing the at least two cameras, and calibrating the at least two cameras based on the calibration scale to obtain the scan path of the at least two cameras and the complete calibrated image comprises:

determining the scan path of the at least two cameras based on the calibration scale;

obtaining at least two calibrated images captured by the at least two cameras along the scan path;

splicing the at least two calibrated images to obtain the complete calibrated image; and calculating a resolution of a sub-area in which one first calibration block in the complete calibrated image is located.

15. The detection method according to claim 12, wherein the target parameter comprises at least one of a coating width, a coating gap width, a coating edge width, and a coating defect dimension.

* * * * *